(12) United States Patent
Guo et al.

(10) Patent No.: US 7,105,601 B2
(45) Date of Patent: Sep. 12, 2006

(54) ADHESIVE RESIN WITH HIGH DAMPING PROPERTIES AND METHOD OF MANUFACTURE THEREOF

(75) Inventors: Hong-Fei David Guo, Pomfret Center, CT (US); Robert Henry Walker, III, Phoenix, AZ (US)

(73) Assignee: World Properties, Inc., Lincolnwood, IL (US)

( * ) Notice: Subject to any disclaimer, the term of this patent is extended or adjusted under 35 U.S.C. 154(b) by 141 days.

(21) Appl. No.: 10/325,656

(22) Filed: Dec. 19, 2002

(65) Prior Publication Data
US 2003/0134961 A1    Jul. 17, 2003

Related U.S. Application Data

(60) Provisional application No. 60/342,878, filed on Dec. 20, 2001.

(51) Int. Cl.
*C08L 31/00* (2006.01)
(52) U.S. Cl. ........... 525/132; 525/133; 525/134; 525/143; 525/222; 525/227; 525/228
(58) Field of Classification Search ........ 525/132–134, 525/143, 222, 227, 228
See application file for complete search history.

(56) References Cited

U.S. PATENT DOCUMENTS

| | | | |
|---|---|---|---|
| 4,255,486 A * | 3/1981 | Burke et al. | 428/356 |
| 4,740,427 A * | 4/1988 | Ochiumi et al. | 428/463 |
| 4,760,478 A | 7/1988 | Pal et al. | 360/104 |
| 4,819,094 A | 4/1989 | Oberg | 360/104 |
| 5,027,241 A | 6/1991 | Hatch et al. | 360/105 |
| 5,498,471 A * | 3/1996 | Hausdorf et al. | 442/142 |
| 5,629,365 A * | 5/1997 | Razavi | 524/37 |
| 5,793,569 A | 8/1998 | Christianson et al. | 360/104 |
| 5,801,905 A | 9/1998 | Schirle et al. | 360/104 |
| 5,877,919 A | 3/1999 | Foisy et al. | 360/104 |
| 6,005,750 A | 12/1999 | Willard et al. | 360/104 |
| 6,376,633 B1 * | 4/2002 | Yamamoto et al. | 526/329.7 |

FOREIGN PATENT DOCUMENTS

| | | |
|---|---|---|
| EP | 0 164 728 A2 | 6/1985 |
| EP | 0 617 411 A2 | 9/1994 |
| EP | 0 802 251 A1 | 10/1997 |
| JP | 60-258262 | 12/1985 |
| JP | 5-295054 | 11/1993 |

OTHER PUBLICATIONS

Billmeyer; Textbook of Polymer Science, 3$^{rd}$ edition; 1984; pp. 472-473.*
International Search Report mailed May 19, 2003.
JP 2001 158841. Dec. 6, 2001. Abstract only.

* cited by examiner

Primary Examiner—Rachel Gorr
(74) Attorney, Agent, or Firm—Cantor Colburn LLP

(57) ABSTRACT

An adhesive resin composition comprising, based on the total weight of the composition, a first resin component having one or more glass transition temperatures of about −15 to about 50° C.; optionally, up to about 49 weight percent of a second resin component having one or more glass transition temperatures greater than about 100° C.; and up to about 50 weight percent of a particulate inorganic filler; wherein a tan δ value of the adhesive resin composition is greater than about 0.2 over a temperature range of about −15 to about 50° C. when measured at a frequency of 1 Hz. The adhesive resin compostions are of particular utility in suspension assemblies.

48 Claims, 6 Drawing Sheets

ADHESIVE RESIN WITH HIGH DAMPING PROPERTIES AND METHOD OF MANUFACTURE THEREOF

CROSS REFERENCE TO RELATED APPLICATIONS

This application claims priority pursuant to 35 U.S.C. 119(e) to U.S. application Ser. No. 60/342,878 filed Dec. 20, 2001, the above application being incorporated herein by reference in its entirety including incorporated material.

BACKGROUND OF INVENTION

This invention relates to disk drives, and in particular relates to metal laminates for disk drives comprising resin disposed on one metal layer or between two metal layers.

Disk drives store information on concentric, recorded tracks written on one or more rotatable magnetic recording disks. A magnetic head or transducer element is provided for each such disk, and moves from track to track, to either read previously stored information or to record information on the magnetic tracks ("read"-"write", respectively). The electromagnetic transducer typically is carried in a slider body mechanism that is supported over the surface of a rotating disk by a self-acting, hydrodynamic air bearing. The slider body/transducer combination is referred to collectively as a "head", and it is attached to a suspension assembly that suspends and loads the head toward the disk surface. The suspension assembly is in turn connected to a rotary or linear actuator that controllably moves the head from track to track on the disk, in response to electrical signals generated by controlling circuitry.

The suspension assembly may comprise a single element or several connected elements. Generally the suspension assembly comprises a structural element and a circuit element. The structural element, sometimes known as a load beam, provides physical support for the head and the circuit element electronically connects the head to the remainder of the disk drive. In some instances the structural element is configured such that it also functions as the circuit element.

There is a continuing trend towards increasing density in disk drives. Continuing improvements in magnetic recording media, head designs, and control circuitry have permitted data tracks to become narrower and closer together, requiring lighter and more selectively flexible suspension assemblies. Additionally, as data retrieval becomes faster, disks spin at increasing speeds. The increased speeds cause vibrational effects (also known as windage effects). It is becoming increasingly important for the suspension assembly to have damping capability over the disk operating temperature and frequency ranges in addition to being lightweight and selectively flexible.

Laminates are an attractive material for suspension assemblies. Laminates comprising a resin layer and at least one metal layer are widely used in the electronic industry for applications such as circuit boards and components used in disk drives. Laminates are generally required to have high bond strength (peel strength) and high dimensional stability. Some laminate applications require additional characteristics. For example, laminates used in disk drive applications must have low levels of ionic contamination, low melamine levels, contain no silicone, low levels of organic tin (preferably none), and low levels of organic out-gassing.

Chemical etching and plasma etching techniques can be used to achieve the desired bending characteristics of laminates (selective flexibility). The removal of metal by chemical etching and the removal of resin by either chemical etching or plasma etching from selected locations of the laminate and the resultant variations in laminate thickness both reduce the weight of the laminate and change its dynamic characteristics. Etching must have a high rate, be as clean as possible, and must have minimum undercuts to achieve the desired design density.

There is a need in the art for suspension assemblies and laminates with improved properties, particularly damping capability under disk drive operating conditions (temperature and frequency) and good chemical and/or plasma etchability.

SUMMARY OF INVENTION

The above discussed and other needs are met by an adhesive resin composition useful for forming laminates comprising, based on the total weight of the composition, about 5 to about 95 weight percent of a first resin component having one or more glass transition temperatures of about −15 to about 50° C.; about 5 to about 49 weight percent of a second resin component having one or more glass transition temperatures greater than about 100° C.; and up to about 50 weight percent of a particulate inorganic filler, wherein the adhesive resin composition has a loss tangent (tan δ) value greater than about 0.2 over a temperature range of about −15 to about 50° C. when measured at a frequency of 1 Hertz (Hz). The adhesive resin composition may further include about 0.2 to about 1.5 weight percent of a viscosity modifier, based on the total weight of the adhesive resin composition. The adhesive resin composition I expected to exhibit excellent damping characteristics over temperatures of about 0° C. to about 60° C. and over frequency ranges of about 1,000 Hz to about 25,000 Hz.

The adhesive resin composition may be disposed on a metal layer to form a two-layer composite comprising an adhesive resin layer and a metal layer. An additional metal layer may be disposed on the adhesive resin layer of the composite on a side opposite to the first metal layer to form a three-layer composite. The three-layer composite is particularly useful for making a suspension assembly structural elements for disk drives because it has a high peel strength and excellent damping capability. It is also economical and convenient to manufacture.

In another embodiment, a suspension assembly structural element comprises a first metal layer fixedly attached to a second metal layer by an adhesive resin layer comprising at least 50 percent by weight of a first resin component having one or more glass transition temperatures of about −15 to about 50° C., wherein the adhesive resin layer has a wide damping curve with a loss tangent (tan δ) value greater than about 0.2 over temperatures of about −15 to about 50° C. The adhesive resin layer can further comprise a second resin component having one or more glass transition temperatures greater than 100° C., and/or an inorganic particulate filler.

In another embodiment a suspension assembly structural element comprises a circuit component disposed on a composite, wherein the composite comprises a first metal layer fixedly attached to a second metal layer by an adhesive resin layer comprising a first resin component having one or more glass transition temperatures of about −15 to about 50° C. The adhesive resin layer has a wide damping curve with a tan δ value greater than about 0.2 over temperatures of about −15 to about 50° C. The adhesive resin layer can further comprise a second resin component having one or more glass transition temperatures greater than 100° C., and/or an inorganic particulate filler.

The above discussed and other features and advantages will be appreciated and understood by those skilled in the art from the following detailed description and drawings.

BRIEF DESCRIPTION OF DRAWINGS

Referring now to the exemplary drawings wherein like elements are numbered alike in the several FIGURES.

DETAILED DESCRIPTION

Figure 1:
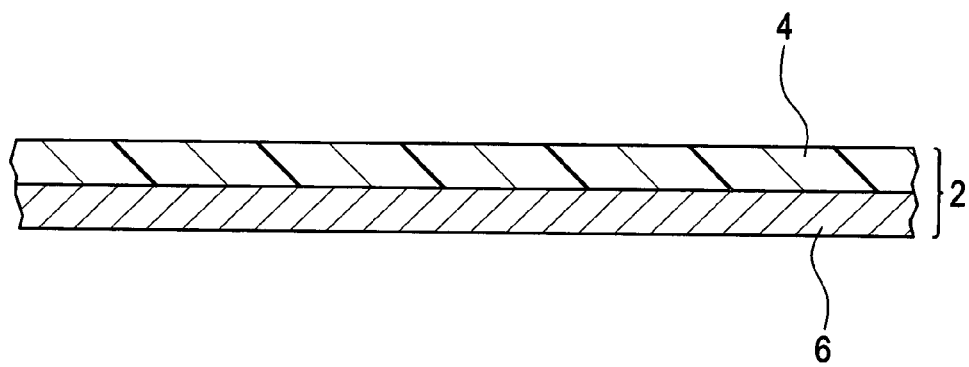
FIG. 1 is a schematic representation of a two-layer composite.

An adhesive resin composition useful for forming composites, particularly suspension assembly structural elements, comprises a first resin component having one or more glass transition temperatures of about −15 to about 50° C., and a wide damping curve described by the tan δ value of greater than about 0.2 over temperatures of about −15 to about 50° C. when measured at a frequency of 1 Hz. As used herein, tan δ is defined as the loss modulus divided by the storage modulus. The tan δ can be measured by dynamic mechanical analysis (DMA), and can be used to predict the damping properties of a material. Usually, the higher the tan δ of a material over a given temperature range, the more efficient the material is in damping over that temperature range. When a material has low tan δ values, e.g., below 0.1 or 0.05 over a given temperature range, it normally has poor damping efficiencies over that temperature range. The adhesive resin composition may also comprise a second resin component having one or more glass transition temperatures greater than 100° C., and/or an inorganic particulate filler. The second resin component helps to provide a stable storage modulus at temperatures of about −15 to about 50° C. The adhesive resin composition also displays superior adhesion to various metals, including stainless steel. Other important properties exhibited by the adhesive resin composition include good chemical resistance, excellent thermal stability, low out-gassing and low ionic level, chemical and plasma etchability, and the like.

The first resin component may comprise one resin, or a combination of resins, each with a glass transition temperature of about −15 to about 50° C. The first resin component typically exhibits a wide tan δ curve with one peak or multiple peaks over temperatures of about −15 to about 50° C. at a frequency of about 1 Hz as determined by dynamic mechanical analysis (DMA). Preferably the tan δ values under the entire curve are greater than about 0.2. Exemplary resins include, but are not limited to, latex or solvent based acrylic resins, solvent based acrylic elastomers, natural rubbers, synthetic rubbers, other elastomers meeting the above-described criteria, and combinations comprising at least one of the foregoing resins.

A particularly preferred elastomer is an acrylic copolymer, preferably in the form of a latex, that comprises a plurality of repeating units of the general formula (I):

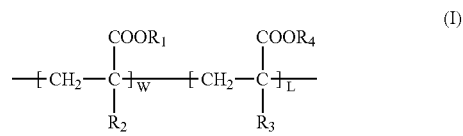

wherein $R_1$ and $R_4$ are independently an alkyl group with 1 to 20 carbons, hydrogen, an alkyl with up to 6 carbons with hydroxy functionality, or any other functional group known to be useful in acrylic copolymers. Preferred functional groups include methyl, hexyl, butyl, and hydroxyl. $R_2$ and $R_3$ are independently an alkyl group with 1 to 20 carbons or hydrogen. Preferred functional groups include hydrogen, methyl, hexyl, butyl, methylol, carboxyl, and hydroxyl. W and L are greater than or equal to 1. The term copolymer refers to the fact that one acrylic ester has been polymerized with another acrylic ester, typically differing in the identity of $R_1$ and $R_4$.

As readily understood by one of ordinary skill in the art, latexes are aqueous emulsions/suspension of already polymerized compositions. The acrylic copolymer latex is preferably in an emulsion, even more preferably an emulsion with greater than 40% solids. Examples of useful acrylic copolymer latexes include, but are not limited to, acrylic copolymer latexes commercially available from Noveon under the tradename Hycar 2679 and Hycar 26256.

Combinations comprising two or more different elastomers may also be used. When two or more elastomers are employed, it is preferable for at least one of the elastomers to have a glass transition temperature of about −5° C. to about 10° C., and at least one elastomer to have a glass transition temperature of about 10° C. to about 50° C. By employing two elastomers with different glass transition temperatures, it is believed that a tan δ value of greater than about 0.2 at a frequency of about 1 Hz can be obtained over a larger temperature range than would be possible with a single elastomer.

The first resin component may be present in an amount of about 50 to about 95 weight percent, based on the total weight of the adhesive resin composition. Within this range, a weight percent of less than or equal to about 90 is preferred, and a weight percent of greater than or equal to about 60 is preferred, based on the total weight of the adhesive resin composition.

The second resin component comprises one or more resins having glass transition temperatures greater than about 100° C., and more preferably greater than about 150° C. Useful resins include, but are not limited to, phenolic resins, acrylic resins, polyphenylene ether resins, and combinations comprising at least one of the foregoing resins.

Phenolic resins are known polymers comprising a plurality of structural units of the formula (II):

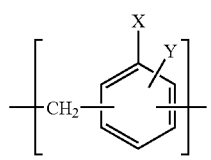

(II)

wherein for each structural unit, Y is independently a hydrogen, halogen, primary or secondary lower alkyl (e.g., alkyl containing up to 7 carbon atoms), alkoxy, phenyl, haloalkyl, aminoalkyl, hydrocarbonoxy, halohydrocarbonoxy, aryl, allyl, phenylalkyl, hydroxy substituted alkyl comprising up to 6 carbons, such as methylol, or the like, and X is a hydroxy. Useful phenolic resins are liquid, including high viscosity liquids, and typically have a molecular weight of about 300 to about 1000, preferably about 300 to about 800, and more preferably about 300 to about 600. A preferred phenolic resin is commercially available from Occidental Chemical under the tradename Durez 12704.

The presence of the second resin component may improve properties such as stable storage modulus over temperatures of about −15 to about 50° C., chemical resistance, adhesion, and chemical and plasma etchabilities. Stable storage modulus is defined herein as changing by less than about 3, and preferably less than about 2, orders of magnitude in a log scale over a temperature range of about −10° C. to about 50° C. The second resin component is typically present in an amount of up to about 49 weight percent, preferably about 5 to about 35 weight percent, and more preferably about 10 to about 25 weight percent, wherein weight percent is based on the total weight of the adhesive resin composition.

In an exemplary embodiment, in addition to the first resin component and the second resin component, the adhesive resin composition further comprises a viscosity modifier. Useful organic viscosity modifiers typically are acrylic polymers or copolymers that are base activated. Base activated is herein defined as thickening or swelling at a pH above 7. Organic viscosity modifiers may be used singly or in combination.

Examples of useful organic viscosity modifiers include glycerol distearate, polyethylene glycol stearate, glyceryl stearate, polymethacrylates, polyalkylacrylates, polyalkylmethacrylates, methacrylate copolymers, interpolymers of styrene and acrylic esters, carboxamido containing polymers, polyvinyl pyrrolidone, salts of acrylic and methacrylic acid polymers, styrene-maleic anhydride copolymers, polyacrylic acid compounds, polyethylene oxide. A preferred organic viscosity modifier is an acrylic copolymer of ethyl acrylate, methacrylic acid, and methyl methacrylate, available from Rohm and Haas under the tradename Acrysol ASE-75. Another preferred organic viscosity modifier is RM-5, also available from Rohm and Haas. Combinations comprising two or more organic viscosity modifiers may also be used. The organic viscosity modifier or combination of organic viscosity modifiers is typically present in an amount of about 0.2 to about 1.5 weight percent based on the total weight of the adhesive resin composition.

Where desired, inorganic fillers may be added to the adhesive resin composition, preferably in small amounts, to adjust the properties of the composition. Inorganic fillers are generally in particulate form, and include, for example, silica, alumina, titania, zirconia, glass, and the like, and combinations comprising at least one of the foregoing. The fillers may be present in amounts of up to about 50 weight percent, with about 1 to about 25 weight percent preferred, and with about 0.5 to about 10 weight percent more preferred, wherein weight percent is based on the total weight of the adhesive resin composition.

In an exemplary embodiment, the adhesive resin composition consists essentially of a liquid phenolic resin, an elastomer, and an organic viscosity modifier. By "consists essentially of" is meant that the resin composition is substantially free of inorganic filler, particularly silica filler. "Substantially free" is herein defined as having less than about 1 weight percent, preferably less than about 0.5 weight percent, and even more preferably less than about 0.25 weight percent of the inorganic filler, based on the total weight of the adhesive resin composition.

The adhesive resin composition is typically made by intimately mixing the first resin component along with the second resin component, and/or viscosity modifiers, and/or inorganic fillers with or without a solvent to form a resin composition mixture. Useful solvents include water, an alcohol comprising from 1 to about 8 carbons, mixtures of water and an alcohol comprising from 1 to about 8 carbons, methyl ethyl ketone, toluene, xylene, and combinations comprising at least one of the foregoing solvents. If the pH of the resin composition mixture is less than about 7, then a suitable basic composition such as ammonia or sodium hydroxide may be added to increase the pH. Suitable basic compositions are those that will not negatively affect the resin composition mixture when employed in the amounts necessary to increase the pH to the desired value. The pH of the resin composition mixture preferably does not exceed about 8. During mixing, the temperature is kept typically less than or equal to about 50° C., and preferably is less than or equal to about 40° C.

The resin composition mixture may then be disposed as an adhesive resin layer onto a metal layer by methods known in the art to form a two-layer composite. As used herein and throughout, "disposed" refers to the whole or partial physical communication between the respective layers.

Where the resin composition mixture comprises a solvent, appropriate application methods include spraying, painting, roll coating, rod coating, blade coating, wire rod coating, extrusion coating, air knife coating, curtain coating, slide coating, doctor coating, gravure coating, and the like. The adhesive resin layer may then be dried. Drying, when necessary, can be performed at ambient temperature, but preferably drying occurs in an oven at a temperature less than about 115° C., and preferably at a temperature of about 70° C. to about 105° C. In an alternative method, the resin composition mixture comprising a solvent may be applied as an adhesive resin layer to a release material using the above-described methods. The adhesive resin layer may be separated from the release material and disposed onto the metal layer, optionally using heat and pressure.

In the absence of solvent, the resin composition mixture may be formed into a film by methods known in the art, for example by powder coating or extrusion, and disposed onto the metal layer, optionally using heat and pressure.

The thickness of the adhesive resin layer is preferably about 12 micrometers to about 50 micrometers, with about 15 micrometers to about 25 micrometers preferred, and with about 18 micrometers especially preferred. If necessary, the adhesive resin layer may be cured by, for example, lamination or heat application.

A two-layer composite comprising the adhesive resin composition disclosed herein is shown in FIG. 1. FIG. 1 depicts a two-layer composite 2 comprising an adhesive resin layer 4 disposed on a metal layer 6. Adhesive resin layer 4 comprises the adhesive resin composition disclosed herein. Preferably metal layer 6 is stainless steel. Adhesive resin layer 4 has good flow, excellent adhesion, and provides very high levels of peel strength to two-layer composite 2.

Figure 2:
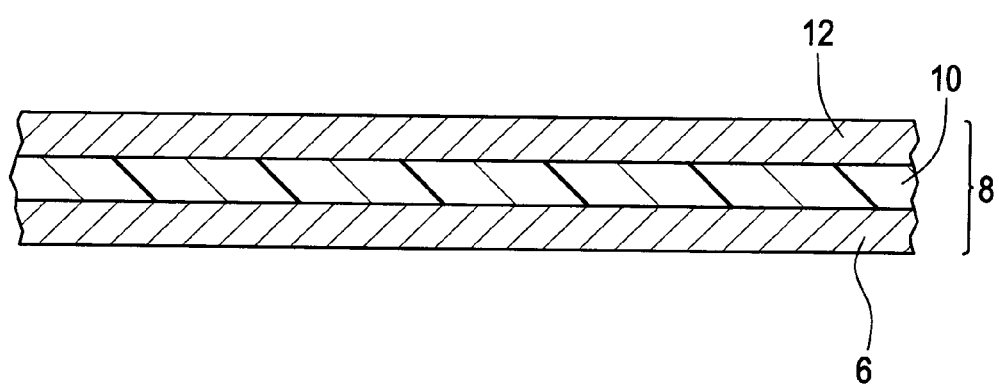
FIG. 2 is a schematic representation of a three-layer composite.

Before or after cure of the adhesive resin layer, an additional metal layer may be disposed onto the adhesive resin layer of the two-layer composite to form a three-layer composite. Where the adhesive resin layer requires curing, the additional metal layer may be disposed before or after curing. The layers are generally adhered by lamination using an effective amount of heat and pressure. The lamination temperature is dependent upon the identities of the first and second resin components and is readily determined by one of skill in the art. As shown in FIG. 2, a three-layer composite 8 comprises a first metal layer 6 disposed onto an adhesive resin layer 10. Adhesive resin layer 10 comprises the adhesive resin composition disclosed herein. Adhesive resin layer 10 is also disposed onto a second metal layer 12.

The three-layer composite is ideally suited for making structural elements for suspension arm assemblies for hard disk drives because it has a high peel strength, excellent damping ability (due to the high tan δ value of the resin composition in the operating temperature and frequency range) and excellent chemical and/or plasma etchability. The three-layer composite exhibits excellent stiffness, and yet can be locally etched to result in the selective flexibility necessary for high performance suspension assemblies.

Additional advantages include organic out-gassing of less than about 1.0 weight percent, preferably less than 0.1 weight percent, over 72 hours at room temperature, wherein weight percent is based on the total weight of the adhesive composition; little or no melamine, e.g., less than about 1.0 weight percent, preferably less than 0.1 weight percent, based on the total weight of the adhesive composition; little or no organic tin present, e.g., less than about 0.1 weight percent, preferably less than 0.01 weight percent, based on the total weight of the adhesive composition; no silicone present, e.g., less than about 0.1 weight percent, preferably less than 0.01 weight percent, based on the total weight of the adhesive composition; and low levels of ionic and anionic contaminants, e.g., less than about 0.1 weight percent, preferably less than 0.01 weight percent, based on the total weight of the adhesive composition. These additional advantages are all important for compositions employed in the manufacture of disk drives.

Useful metal layers include stainless steel, copper, aluminum, zinc, iron, transition metals, and metal alloys, with stainless steel preferred. There are no particular limitations regarding the thickness of the metal layer, nor are there any limitations as to the shape, size, or texture of the surface of the metal layer. Preferably however, the metal layer comprises a thickness of about 30 micrometers to about 70 micrometers, with about 32 micrometers to about 64 micrometers especially preferred. When two or more metal layers are present the thickness of the two layers may be the same or different. Additionally, the metal layer may be used as obtained from the supplier or subsequent to a cleaning procedure such as burnishing.

Figure 3:
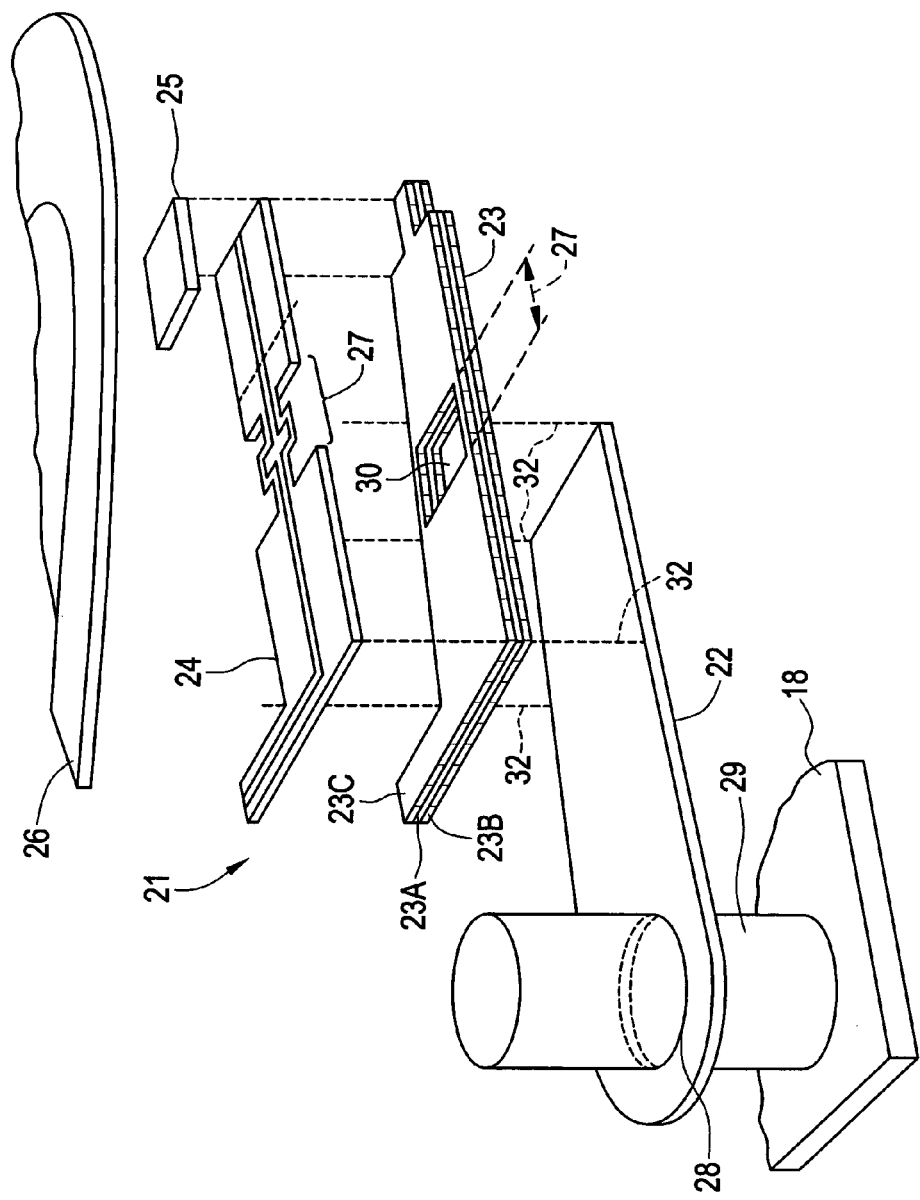
FIG. 3 is a schematic representation of a suspension assembly.

FIG. 3 illustrates a disk 26 and a suspension assembly 21 that includes a mount plate 22, a structural element 23, and a circuit element 24 with a slider 25 mounted on suspension assembly 21. Structural element 23 comprises a first stainless steel layer 23C fixedly attached to a second stainless steel layer 23B by a resin layer 23A. Mount plate 22 has an aperture 28 and is pivotally mounted on a shaft 29 fixed on a frame 18 of a disk drive (not shown). Resin layer 23A comprises the adhesive resin layer composition disclosed herein.

Structural element 23 includes a rear portion fixed to a free end of mount plate 22, a front portion, and a central portion defined by the length of an aperture 30, which provides a hinge portion 27. One end of structural element 23 is aligned with the free end of mount plate 22 as shown by dashed lines 32 and is fixed to the free end of mount plate 22. Circuit element 24 is positioned over first stainless steel layer 23C. Slider 25 is directly mounted onto circuit element 24.

The adhesive resin composition exhibits excellent adhesion to various metals, including stainless steel. The adhesive resin composition also exhibits excellent damping capabilities in the operating temperature range of 0° C. to about 60° C. over a frequency range of about 1,000 Hz to about 25,000 Hz.

The adhesive resin composition further exhibits other properties, including good chemical resistance and thermal stability, good thermal and mechanical properties, good plasma and chemical etchabilities, extremely low out-gassing and ionic level, and the like. For example, the adhesive resin composition exhibits peel strengths of greater than about 14 pli; tensile strengths of greater than about 650 psi; tensile moduli of greater than about 375, and elongations at break of up to about 500%.

The following examples are provided to illustrate the invention, but are not intended to limit the scope thereof.

EXAMPLES

In the following examples all parts and percentages are by weight unless otherwise indicated. Three adhesive resin composition samples were prepared by batch mixing the respective components listed in Tables 1, 3, and 5 below under shear agitation with or without a solvent as indicated in the individual examples.

Each sample was applied to a different substrate by hand using a draw down rod. The substrate was either a 51 micrometer Teflon® polytetrafluoroethylene (PTFE) film or a 25 micrometer Kapton® polyimide film, each available from DuPont. The samples were then dried in an oven at 80–90° C. for 10 minutes to form an adhesive resin layer having a thickness of about 25 micrometers.

After drying, the adhesive resin layers on the PTFE film were removed from the film and stacked into a mold and laminated into 250 micrometer to 500 micrometer thick sheets to make samples for mechanical and thermal testing. The adhesive resin layers on the polyimide film were laminated with 36 micrometer thick copper foils to make a three-layer polyimide/adhesive resin layer/copper laminate. The polyimide/adhesive resin layer/copper laminates were made with either the treated copper side disposed on the adhesive resin layer or the copper shiny side disposed on the adhesive resin layer. All laminations were conducted by using a press at a temperature of 150–200° C., and at a pressure of 300 pounds per square inch (psi), for 60–90 minutes. The adhesive resin layers were cured during lamination.

The resulting laminates were tested for peel strength according to IPC Test Method TM-650-2.4.9. Peel strength was tested with both the treated side and the shiny side of the copper foil next to the adhesive resin layer. The laminates were also tested for tensile modulus, strength, and elongation according to ASTM D1708. Additionally, DMA measurements were performed to determine various thermal and mechanical properties of the adhesive, including storage and loss modulus, tan δ, and glass transition temperatures. The DMA measurements were conducted under a single frequency of 1 Hz, while varying the temperature from −50 to 200° C. at a temperature ramp of 10° C./min. The damping properties of the adhesives were predicted based on DMA results.

Example 1

Figure 4:
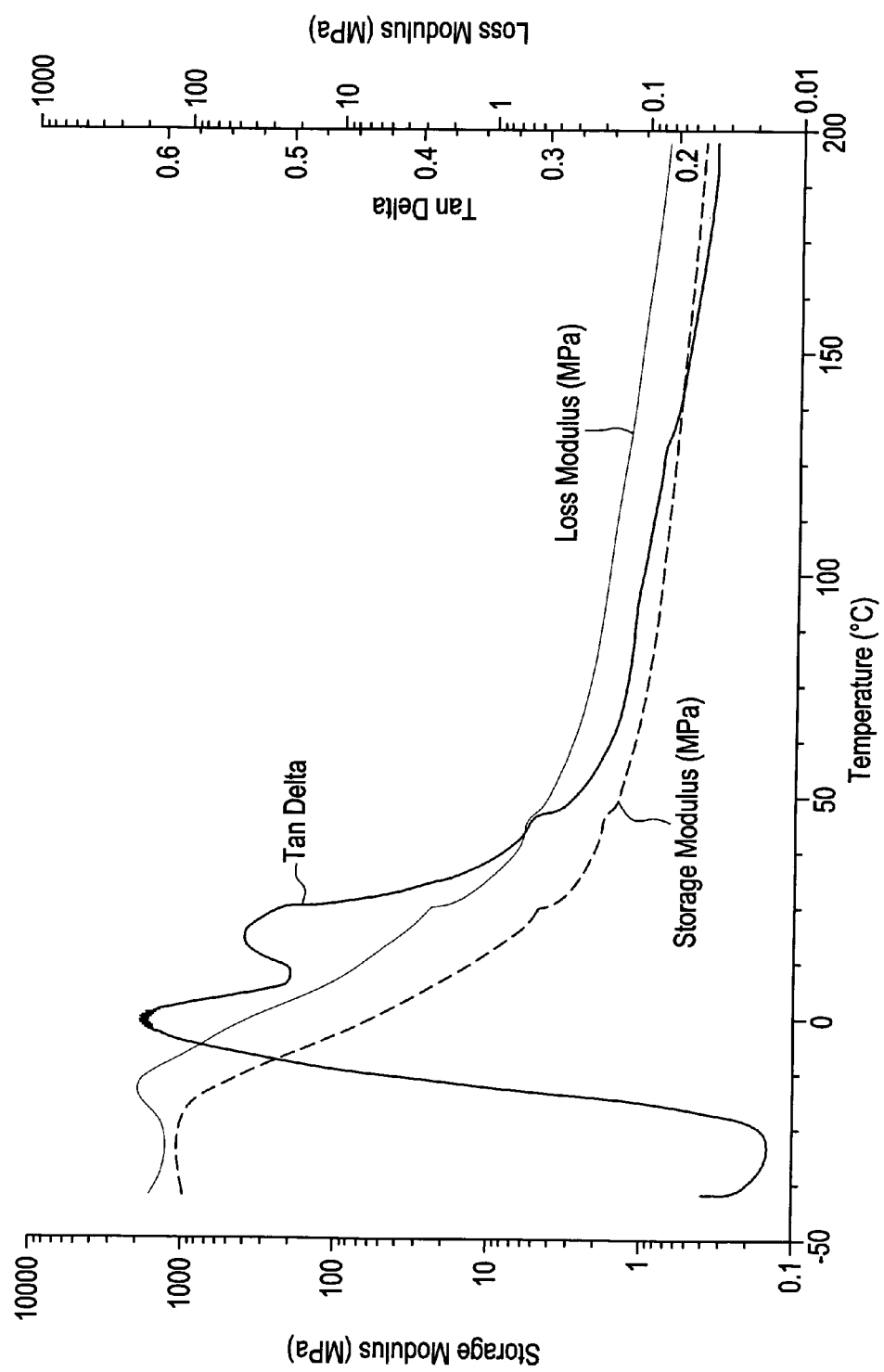
FIG. 4 is a graphical representation of a dynamic mechanical analysis of an adhesive resin composition.

The composition and properties of a first adhesive resin composition sample are described in Tables 1 and 2 below. DMA measurements obtained from the first sample are shown in FIG. 4.

TABLE 1

| Components | Supplier | Weight Percent |
| --- | --- | --- |
| Durez 12704 Phenolic Resin | Durez Corp. | 6.2 |
| Hycar 2679 Latex Acrylic Resin | Noveon, Inc. | 10 |
| Hycar 26083 Latex Acrylic Resin | Noveon, Inc. | 63.5 |
| Hycar 26349 Latex Acrylic Resin | Noveon, Inc. | 10 |
| Acrysol ASE-75 Emulsion Resin | Rohm and Hass | 1.5 |
| Nalco 2308 Defoamer | Nalco Chemical | 0.5 |
| Acrysol RM-5 Rheology Modifier | Rohm and Hass | 0.1 |
| Deionized Water | — | 6.2 |
| Isopropyl Alcohol | Aldrich Chemical | 2 |

TABLE 2

| Properties | |
| --- | --- |
| Peel Strength (treated side) (pli) | 14.3 |
| Peel Strength (shiny side) (pli) | 7.5 |
| Tensile Strength (psi) | 559 |
| Tensile Modulus (psi) | 376 |
| Elongation at Break (%) | 285 |
| DMA | FIG. 4 |

As shown by Table 2, the first sample exhibits excellent physical and mechanical properties, including high peel strength, high tensile elongation, and good thermal stability. For example, peel strengths of greater than about 14 pounds per linear inch (pli) are obtained; tensile strengths of greater than about 550 pounds per square inch (psi) are obtained; tensile modulum of greater than about 375 psi are obtained, and elongations at break of up to about 285% are obtained.

Additionally, the DMA measurements indicate that the first sample has good damping properties. For example, FIG. 4 indicates that a tan δ value of about 0.2 to about 0.6 may be obtained over a temperature range of about −15° C. to about 200° C. More specifically, a tan δ value of up to about 0.6 is achieved at temperatures of about 0° C., and a tan δ value of up to about 0.55 is achieved at temperatures of about 25° C.

Figure 5:
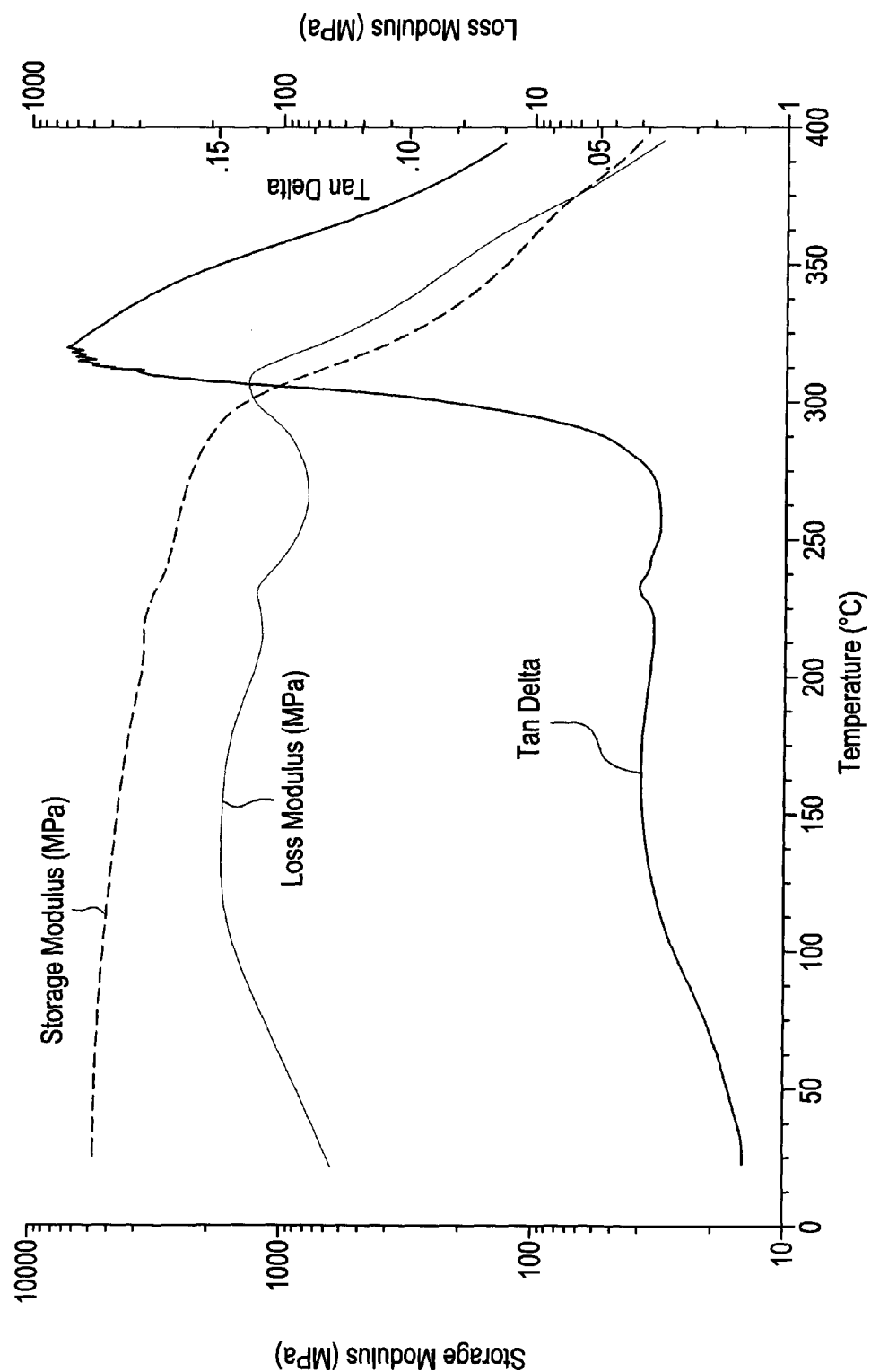
FIG. 5 is a graphical representation of a dynamic mechanical analysis of a polymeric resin which has low tan δ and low damping properties over the temperature range of interest.

As a comparison, a DMA curve of a comparative resin currently used in load beam applications is shown in FIG. 5. This material shows a tan δ curve with values below 0.05 throughout the temperature range of interest. The damping properties of this material will not be good under the disk drive operation conditions.

Example 2

Figure 6:
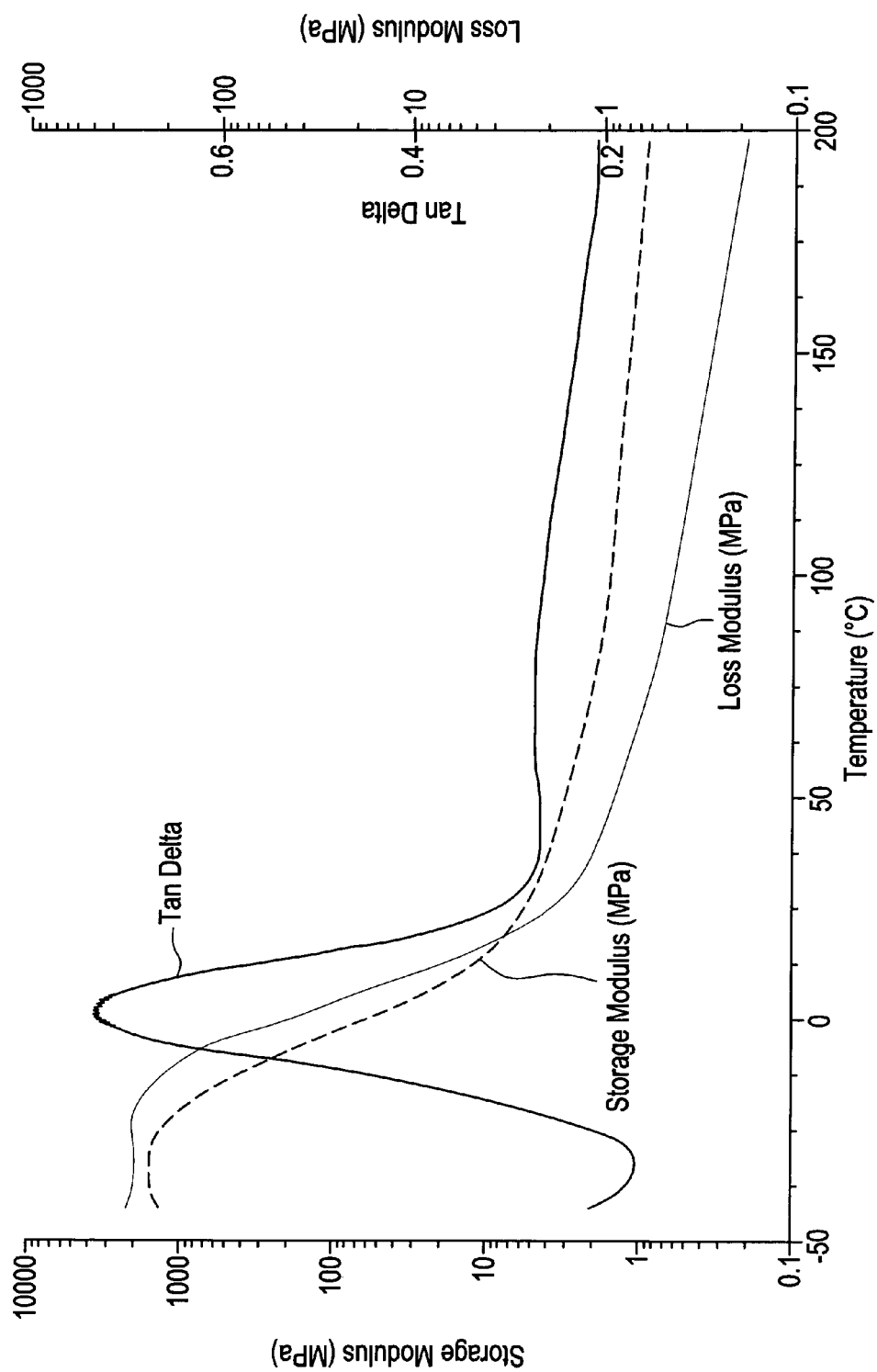
FIG. 6 is a graphical representation of dynamic mechanical analysis of a comparative adhesive resin composition.

The composition and properties of a second adhesive resin composition sample are described in Tables 3 and 4 below. DMA measurements obtained from the second sample are shown in FIG. 6.

TABLE 3

| Components | Supplier | Weight Percent |
| --- | --- | --- |
| Durez 12704 Phenolic Resin | Durez Corp. | 6.2 |
| Hycar 2679 Latex Acrylic Resin | Noveon, Inc. | 10 |
| Airflex 420 Latex Acrylic Resin | Air Products and Chem. | 43.5 |
| Airflex 405 Latex Acrylic Resin | Air Products and Chem. | 15 |
| Airflex 409 Latex Acrylic Resin | Air Products and Chem. | 15 |
| Acrysol ASE-75 Emulsion Resin | Rohm and Hass Co. | 1.5 |
| Nalco 2308 Defoamer | Nalco Chemical Co. | 0.5 |
| Acrysol RM-5 Rheology Modifier | Rohm and Hass Co. | 0.1 |
| Deionized Water | — | 6.2 |
| Isopropyl alcohol | Aldrich Chemical Co. | 2 |

TABLE 4

| Properties | |
| --- | --- |
| Peel Strength (treated Cu) (pli) | 6.5 |
| Tensile Strength (psi) | 100 |
| Tensile Modulus (psi) | 230 |
| Elongation at Break (%) | 506 |
| DMA | FIG. 5 |

As shown by Table 4, the second sample exhibits excellent physical and mechanical properties, including high peel strength, high tensile elongation, and good thermal stability. For example, peel strengths of greater than about 6.5 pli are obtained; tensile strengths of greater than about 100 psi are obtained; tensile modulum of greater than about 230 psi are obtained, and elongations at break of up to about 506% are obtained.

Additionally, the DMA measurements indicate that the second sample has good damping properties. For example, FIG. 6 indicates that a tan δ value of about 0.2 to about 0.7 may be obtained over a temperature range of about −15° C. to about 200° C. More specifically, a single curve having a tan δ value of up to about 0.7 is achieved at temperatures of about 0° C., and a tan δ value of up to about 0.55 is achieved at temperatures of about 25° C.

Example 3

Figure 7:
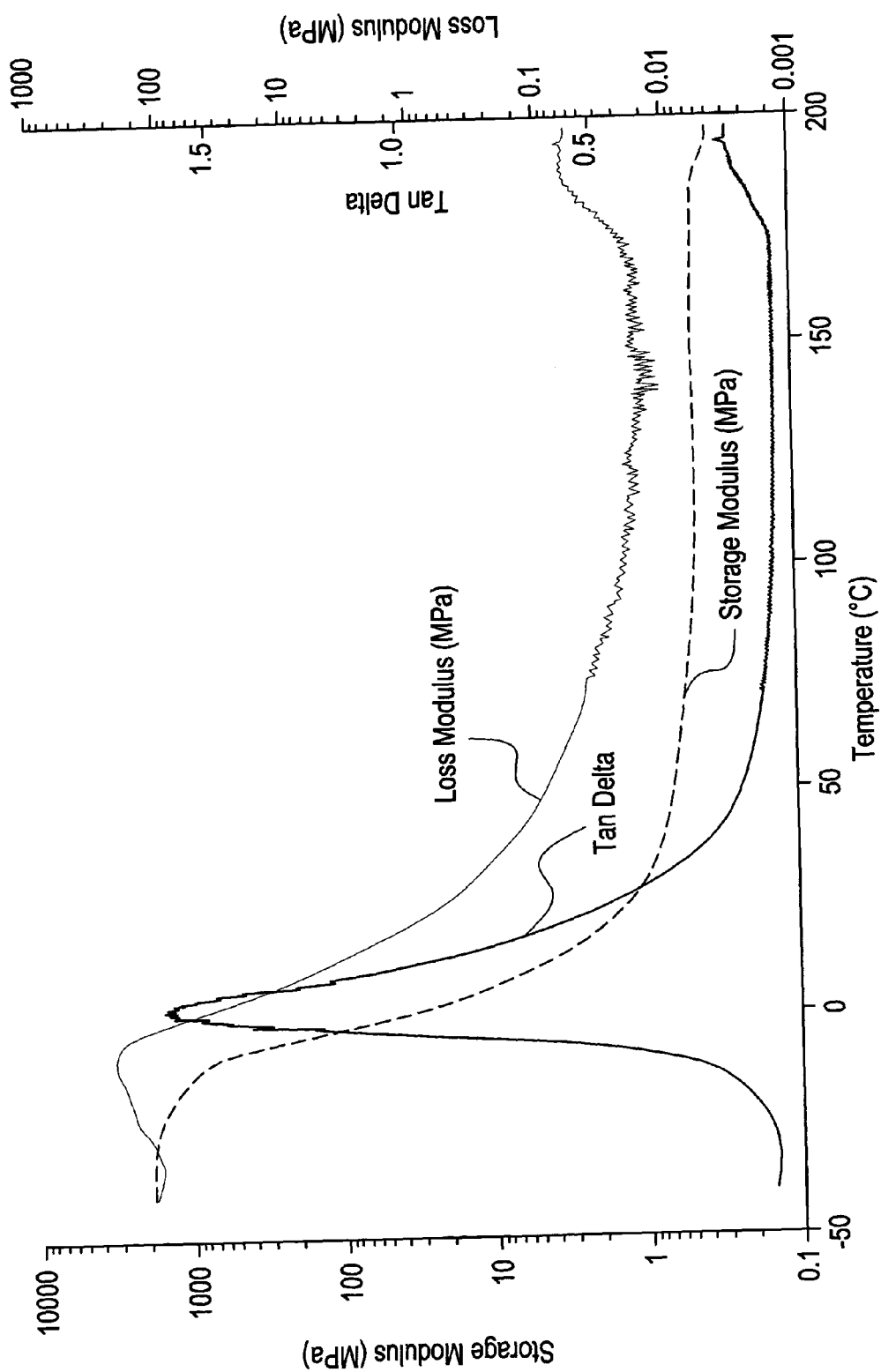
FIG. 7 is a graphical representation of dynamic mechanical analysis of an adhesive resin composition.

Components detailed in Table 5 below were used to form a third adhesive resin composition sample. This sample was prepared by dissolving each resin in methyl ethyl ketone. The solid level of the mixture was 50 weight percent based on the total weight of the mixture. The solvent was evaporated during the drying process of the adhesive resin layer. Properties obtained from this third sample are shown in Table 6 below, and the resulting damping properties are demonstrated by the DMA measurements shown in FIG. 7.

TABLE 5

| Components | Supplier | Weight Percent |
| --- | --- | --- |
| Nipol AR-51 Acrylic Rubber | Zeon Chemicals L.P. | 50 |
| Nipol AR-53 Acrylic Rubber | Zeon Chemicals L.P. | 15 |
| Durez 94908 Phenolic Resin | Durez Corp. | 12.5 |
| Methylon 75108 Phenolic Resin | Occidental Chemical | 5 |
| Blendex HPP856 Polyphenylene Ether Resin | GE Plastics | 15 |
| Cemel 303 Melamine-Formaldehyde Resin | Cytec Industries | 1.0 |
| Dicyandiamide | Aldrich Chemical Co. | 0.75 |
| 2-Methylimidazole | Aldrich Chemical Co., | 0.5 |

TABLE 5-continued

| Components | Supplier | Weight Percent |
|---|---|---|
| p-Toluenesulfonic Acid | Aldrich Chemical Co. | 0.25 |
| Methyl Ethyl Ketone | Aldrich Chemical Co. | 100 |

TABLE 6

| Properties | |
|---|---|
| Peel Strength (treated Cu) (pli) | 7.2 |
| Tensile Strength (psi) | 658 |
| Tensile Modulus (psi) | 348 |
| Elongation at Break (%) | 220 |
| DMA | FIG. 6 |

As shown by Table 6, the third sample has excellent physical and mechanical properties, including high peel strength, high tensile elongation, and good thermal stability. The damping properties of this example are also exceptionally good, wherein tan δ values of greater than about 1.5 are obtained at temperatures of about 0° C.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An adhesive resin composition comprising, based on the total weight of the composition:
   about 5 to about 95 weight percent of a first resin component comprising a first resin having a first glass transition temperature of about −15° C. to about 10° C., and a second resin having a second glass transition temperature of about 10° C. to about 50° C., wherein the first glass transition temperature is different from the second glass transition temperature;
   about 5 to about 49 weight percent of a second resin component having one or more glass transition temperatures greater than about 100° C., wherein the second resin component comprises phenolic resin, acrylic resin, polyphenylene ether resin, or a combination comprising at least one of the forgoing resins; and
   up to about 50 weight percent of a particulate inorganic filler; wherein a tan δ value of the adhesive resin composition is greater than about 0.2 over a temperature range of about −15° C. to about 50° C. when measured at a frequency of 1 Hz.

2. The composition of claim 1, wherein the first resin has a glass transition temperature of about −5° C. to about 10° C., and the second resin has a glass transition temperature different from the first glass transition temperature of about 10° C. to about 50° C.

3. The composition of claim 1, wherein the first resin has a first glass transition temperature of about −5° C. to about 0° C., and the second resin has a second glass transition temperature of about 20° C. to about 50° C., and wherein the composition has a tan δ value of greater than about 0.2 at a frequency of about 1 Hz.

4. The composition of claim 1, wherein the first resin component comprises latex acrylic resin, solvent based acrylic resin, solvent based acrylic elastomer, natural rubber, synthetic rubber, or a combination comprising at least one of the foregoing.

5. The composition of claim 4, wherein the first resin component comprises an acrylic copolymer comprising a plurality of repeating units having a general formula:

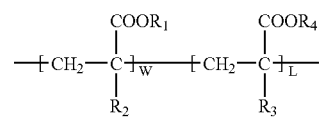

wherein $R_1$ and $R_4$ are independently an alkyl group with 1 to 20 carbons, hydrogen, or an alkyl with up to 6 carbons with hydroxy functionality; $R_2$ and $R_3$ are independently an alkyl group with 1 to 20 carbons or hydrogen; and W and L are greater than or equal to 1.

6. The composition of claim 1, wherein the second resin component has one or more glass transition temperatures greater than about 150° C.

7. The composition of claim 1, wherein the second resin component is present in an amount of about 10 to about 25 weight percent, based on the total weight of the total adhesive resin composition.

8. The composition of claim 1 wherein the phenolic resin comprises a plurality of structural units having the formula

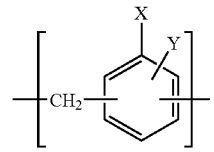

wherein for each structural unit, Y is independently a hydrogen, halogen, primary or secondary lower alkyl, alkoxy, phenyl, haloalkyl, aminoalkyl, hydrocarbonoxy, halohydrocarbonoxy, aryl, allyl, phenylalkyl, or hydroxy substituted alkyl comprising up to 6 carbons, and X is a hydroxy.

9. The composition of claim 1, wherein the second resin is a phenolic resin that has a molecular weight of about 300 to about 1,000.

10. The composition of claim 1, wherein the composition has a storage modulus that changes by less than about 3 orders of magnitude in a log scale over a temperature range of about −10° C. to about 70° C.

11. The composition of claim 1, wherein the inorganic filler comprises silica, alumina, titania, zirconia, glass, or a combination comprising at least one of the foregoing fillers.

12. The composition of claim 1, wherein the inorganic filler is present in an amount up to about 25 weight percent, based on the total weight of the adhesive resin composition.

13. The composition of claim 12, wherein the inorganic filler is present in an amount up to about 10 weight percent, based on the total weight of the adhesive resin composition.

14. The composition of claim 1, further comprising about 0.2 to about 1.5 weight percent of a viscosity modifier, based on the total weight of the adhesive resin composition.

15. The composition of claim 14, wherein the viscosity modifier comprises a base activated acrylic polymer or copolymer.

16. The composition of claim 14, wherein the viscosity modifier comprises glycerol distearate, polyethylene glycol stearate, glyceryl stearate, polymethacrylates, polyalkylacrylates, polyalkylmethacrylates, methacrylate copolymers, interpolymers of styrene and acrylic esters, carboxamido containing polymers, polyvinyl pyrrolidone, salts of acrylic and methacrylic acid polymers, styrene-maleic anhydride copolymers, polyacrylic acid compounds, polyethylene oxide, and combinations comprising at least one of the foregoing.

17. The composition of claim 15, wherein the viscosity modifier comprises an acrylic copolymer of ethyl acrylate, methacrylic acid, and methyl methacrylate.

18. The composition of claim 1, wherein the adhesive resin composition comprises less than about 1 weight percent of the inorganic filler, based on the total weight of the adhesive resin composition.

19. An adhesive resin composition comprising, based on the total weight of the composition:
about 5 to about 95 weight percent of a first resin component comprising a first resin having a glass transition temperature of about −15° C. to about 10° C., and a second, different resin having a second, different glass transition temperature of about 10° C. to about 50° C.;
about 5 to about 49 weight percent of a second resin component having one or more glass transition temperatures greater than about 100° C., wherein the second resin component comprises phenolic resin, acrylic resin, polyphenylene ether resin, or a combination comprising at least one of the forgoing resins; and
about 0.25 to about 25 weight percent of a particulate inorganic filler; wherein a tan δ value of the adhesive resin composition is greater than about 0.2 over a temperature range of about −15° C. to about 50° C. when measured at a frequency of 1 Hz.

20. The composition of claim 19, wherein the first resin has a glass transition temperature of about 5° C. to about 0° C., and the second resin has a glass transition temperature of about 20° C. to about 50° C.

21. The composition of claim 19, wherein the first resin component comprises latex acrylic resin, solvent based acrylic resin, solvent based acrylic elastomer, natural rubber, synthetic rubber, or a combination comprising at least one of the foregoing.

22. The composition of claim 21, wherein the first resin component comprises an acrylic copolymer comprising a plurality of repeating units having a general formula:

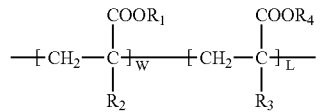

wherein $R_1$ and $R_4$ are independently an alkyl group with 1 to 20 carbons, hydrogen, or an alkyl with up to 6 carbons with hydroxy functionality; $R_2$ and $R_3$ are independently an alkyl group with 1 to 20 carbons or hydrogen; and W and L are greater than or equal to 1.

23. The composition of claim 19, wherein the second resin component has one or more glass transition temperatures greater than about 150° C.

24. The composition of claim 19, wherein the second resin component is present in an amount of about 10 to about 25 weight percent, based on the total weight of the total adhesive resin composition.

25. The composition of claim 19, wherein the phenolic resin comprises a plurality of structural units having the formula

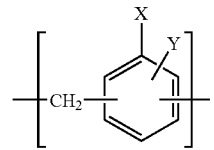

wherein for each structural unit, Y is independently a hydrogen, halogen, primary or secondary lower alkyl, alkoxy, phenyl, haloalkyl, aminoalkyl, hydrocarbonoxy, halohydrocarbonoxy, aryl, allyl, phenylalkyl, or hydroxy substituted alkyl comprising up to 6 carbons, and X is a hydroxy.

26. The composition of claim 19, wherein the phenolic resin has a molecular weight of about 300 to about 1,000.

27. The composition of claim 19, wherein the composition has a storage modulus that changes by less than about 3 orders of magnitude in a log scale over a temperature range of about −10° C. to about 70° C.

28. The composition of claim 19, wherein the inorganic filler comprises silica, alumina, titania, zirconia, glass, or a combination comprising at least one of the foregoing fillers.

29. The composition of claim 19, wherein the inorganic filler is present in an amount up to about 10 weight percent, based on the total weight of the adhesive resin composition.

30. The composition of claim 19, further comprising about 0.2 to about 1.5 weight percent of a viscosity modifier, based on the total weight of the adhesive resin composition.

31. The composition of claim 30, wherein the viscosity modifier comprises a base activated acrylic polymer or copolymer.

32. The composition of claim 30, wherein the viscosity modifier comprises glycerol distearate, polyethylene glycol stearate, glyceryl stearate, polymethacrylates, polyalkylacrylates, polyalkylmethacrylates, methacrylate copolymers, interpolymers of styrene and acrylic esters, carboxamido containing polymers, polyvinyl pyrrolidone, salts of acrylic and methacrylic acid polymers, styrene-maleic anhydride copolymers, polyacrylic acid compounds, polyethylene oxide, and combinations comprising at least one of the foregoing.

33. The composition of claim 31, wherein the viscosity modifier comprises an acrylic copolymer of ethyl acrylate, methacrylic acid, and methyl methacrylate.

34. The composition of claim 19, wherein the adhesive resin composition comprises less than about 1 weight percent of the inorganic filler, based on the total weight of the adhesive resin composition.

35. An adhesive resin composition comprising, based on the total weight of the composition:
about 5 to about 95 weight percent of a first resin component comprising a first resin having a first glass transition temperature of about −5° C. to about 10° C., and a second resin having a second glass transition temperature about 10° C. to about 50° C., wherein the first glass transition temperature is different from the second glass transition temperature;
about 5 to about 49 weight percent of a second resin component having one or more glass transition temperatures greater than about 100° C., wherein the second resin component comprises phenolic resin, acrylic resin, polyphenylene ether resin, or a combination comprising at least one of the forgoing resins; and 0 to less than 1 weight percent of a particulate inorganic filler; wherein a tan δ value of the adhesive resin composition is greater than about 0.2 over a temperature range of about −15° C. to about 50° C. when measured at a frequency of 1 Hz.

36. The composition of claim 35, wherein the first resin has a glass transition temperature of about −5° C. to about 10° C. and the second resin glass transition temperature different from the first glass transition temperature of about 10° C. to about 50° C.

37. The composition of claim 35, wherein the combination of resins includes a first resin having a first glass transition temperature of about −50° C. to about 0° C. at a frequency of about 1 Hz, and a second resin having a second glass transition temperature of about 20° C. to about 50° C. at a frequency of about 1 Hz.

38. The composition of claim 35, wherein the first resin component comprises an acrylic copolymer comprising a plurality of repeating units having a general formula:

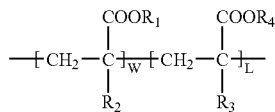

wherein R1 and R4 are independently an alkyl group with 1 to 20 carbons, hydrogen, or an alkyl with up to 6 carbons with hydroxy functionality; R2 and R3 are independently an alkyl group with 1 to 20 carbons or hydrogen; and W and L are greater than or equal to 1.

39. The composite of claim 35, wherein the second resin component has one or more glass transition temperatures greater than about 1 50° C.

40. The composite of claim 35, wherein the second resin component is present in an amount of about 10 to about 25 weight percent, based on the total weight of the adhesive resin layer.

41. The composition of claim 35, wherein the phenolic resin comprises a molecular weight of about 300 to about 1,000.

42. The composite of claim 35, wherein the inorganic filler comprises silica, alumina, titania, zirconia, glass, or a combination comprising at least one of the foregoing fillers.

43. The composition of claim 35, wherein the adhesive resin layer further comprises about 0.2 to about 1.5 weight percent of a viscosity modifier, based on the total weight of the adhesive resin layer.

44. The composition of claim 43, wherein the viscosity modifier comprises a base activated acrylic polymer or copolymer.

45. The composition of claim 43, wherein the viscosity modifier comprises glycerol distearate, polyethylene glycol stearate, glyceryl stearate, polymethacrylates, polyalkylacrylates, polyalkylmethacrylates, methacrylate copolymers, interpolymers of styrene and acrylic esters, carboxamido containing polymers, polyvinyl pyrrolidone, salts of acrylic and methacrylic acid polymers, styrene-maleic anhydride copolymers, polyacrylic acid compounds, polyethylene oxide, and combinations comprising at least one of the foregoing.

46. The composition of claim 45, wherein the viscosity modifier comprises an acrylic copolymer of ethyl acrylate, methacrylic acid, and methyl methacrylate.

47. The composition of claim 35, wherein the adhesive resin layer comprises less than about 0.5 weight percent of the inorganic filler based on the total weight of the adhesive resin layer.

48. The composition of claim 47, wherein the adhesive resin layer has no inorganic filler.

* * * * *